(12) United States Patent
Hodgson et al.

(10) Patent No.: US 8,012,440 B2
(45) Date of Patent: Sep. 6, 2011

(54) METHOD FOR OPERATING A DEVICE HAVING AT LEAST ONE ELECTRICALLY HEATABLE HONEYCOMB BODY AND DEVICE FOR THE CATALYTIC CONVERSION OF EXHAUST GASES

(75) Inventors: Jan Hodgson, Troisdorf (DE); Rolf Brück, Bergisch Gladbach (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/017,059

(22) Filed: Jan. 31, 2011

(65) Prior Publication Data

US 2011/0158870 A1    Jun. 30, 2011

Related U.S. Application Data

(63) Continuation of application No. PCT/EP2009/058018, filed on Jun. 26, 2009.

(30) Foreign Application Priority Data

Jul. 30, 2008   (DE) .......................... 10 2008 035 561

(51) Int. Cl.
*B01D 53/94* (2006.01)
*F01N 3/08* (2006.01)

(52) U.S. Cl. ......... 423/212; 423/213.2; 60/300; 60/303; 60/320

(58) Field of Classification Search .................. 423/212, 423/213.2; 60/300, 303, 320
See application file for complete search history.

(56) References Cited

U.S. PATENT DOCUMENTS

| 5,294,411 | A  | * | 3/1994 | Breuer et al. | ................. 422/174 |
| 6,085,519 | A  |   | 7/2000 | Prior et al. | |
| 2010/0192549 | A1 | * | 8/2010 | Gonze et al. | .................... 60/287 |

FOREIGN PATENT DOCUMENTS

| DE | 9421118 U1 | 7/1995 |
| DE | 44 34 673 A1 | 4/1996 |
| DE | 195 33 307 A1 | 3/1997 |
| DE | 102004041457 A1 | 4/2006 |
| DE | 102005016395 A1 | 10/2006 |

OTHER PUBLICATIONS

International Search Report of PCT/EP2009/058018, Dated Sep. 11, 2009.

* cited by examiner

*Primary Examiner* — Timothy C Vanoy
(74) *Attorney, Agent, or Firm* — Laurence A. Greenberg; Werner H. Stemer; Ralph E. Locher

(57) ABSTRACT

A method is provided for operating a device having at least one electrically heatable honeycomb body through which an exhaust gas can flow. The electrically heatable honeycomb body has at least one current distribution structure to which a plurality of short, successive voltage pulses are initially applied during activation, before a constant heating voltage is applied to the current distribution structure to heat the honeycomb body. A suitable device for the catalytic conversion of exhaust gases in an exhaust system is also provided.

9 Claims, 2 Drawing Sheets

US 8,012,440 B2

METHOD FOR OPERATING A DEVICE HAVING AT LEAST ONE ELECTRICALLY HEATABLE HONEYCOMB BODY AND DEVICE FOR THE CATALYTIC CONVERSION OF EXHAUST GASES

CROSS-REFERENCE TO RELATED APPLICATION

This is a continuation, under 35 U.S.C. §120, of copending International
Application No. PCT/EP2009/058018, filed Jun. 26, 2009, which designated the United States; this application also claims the priority, under 35 U.S.C. §119, of German Patent Application DE 10 2008 035 561.5, filed Jul. 30, 2008; the prior applications are herewith incorporated by reference in their entirety.

BACKGROUND OF THE INVENTION

Field of the Invention

The present invention relates to a method for operating a device having at least one electrically heatable honeycomb body, as is used for the treatment of exhaust gases. Such a device, for example for the catalytic conversion of exhaust gases in an exhaust system, in particular for an exhaust system of an internal combustion engine, preferably for spark-ignition engines, includes, if appropriate, at least one first and one second honeycomb body which are disposed adjacent one another in a common casing tube and which can be traversed in series by an exhaust gas. At least the first, electrically heatable honeycomb body, which has at least one current distributing structure, is disposed in the outer casing tube at a spacing from the casing tube, and the adjacent honeycomb bodies are mechanically connected to one another by support elements which project into the honeycomb bodies. The invention also relates to a device for the catalytic conversion of exhaust gases.

One honeycomb body can then, for example, be electrically heated in order to attain the catalytic conversion of exhaust gases as quickly as possible. The two current distributing structures, which are connected to the lateral surface of the honeycomb body and which are connected to an electrical power terminal, serve to provide a uniform current distribution. The current distributing structures are provided with outwardly projecting pins which are electrically insulated with respect to the casing tube. The pins serve as electrodes for the supply of current to the heatable catalytic converter.

While the electrically heatable honeycomb body is electrically insulated with respect to the common casing tube, the second honeycomb body is connected to the common casing tube which, if appropriate, is connected to ground, in such a way that if the electrical insulation between the support elements and the electrically heatable honeycomb body is impaired, a current can flow through the support elements which project into the honeycomb bodies. That electrical insulation may, for example, be caused by soot depositions between the electrically heatable honeycomb body and the support elements, as a result of which the soot depositions can cause an electrical short circuit with the subsequent formation of an arc, which leads to the destruction of the support elements.

SUMMARY OF THE INVENTION

It is accordingly an object of the invention to provide a method for operating a device having at least one electrically heatable honeycomb body and a device for the catalytic conversion of exhaust gases, which overcome the hereinaforementioned disadvantages and at least partially solve the highlighted problems of the heretofore-known methods and devices of this general type. It is sought, in particular, to specify a way of providing effective protection against damage to and/or destruction of support elements in the devices mentioned above in the introduction.

With the foregoing and other objects in view there is provided, in accordance with the invention, a method for operating a device having at least one electrically heatable first honeycomb body to be traversed by exhaust gas, the at least one honeycomb body having at least one current distributing structure. The method comprises activating the at least one current distributing structure by initially acting on the at least one current distributing structure with a plurality of short successive voltage pulses, and then acting on the at least one current distributing structure with a constant heating voltage to heat the at least one honeycomb body.

It is consequently possible for fixed and/or calculated times for the activation of the device to be determined, and then for heating of the honeycomb body (and of the exhaust gas flowing through it) to be carried out by using the method.

In accordance with another mode of the invention, it is preferable for three to ten voltage pulses to be generated before the heating voltage is applied. It is very particularly preferable for 3 to 5 voltage pulses to be generated. The heating voltage is preferably maintained for several seconds or even minutes, in such a way that the voltage pulses amount to less than 3%, in particular less than 0.1% of the heating period.

In accordance with a further mode of the invention, it is also considered to be advantageous for the voltage pulses to have a duration of 10 to 100 milliseconds. It is particularly preferable for each voltage pulse not to exceed a duration of approximately 50 milliseconds.

In accordance with an added mode of the invention, it may also be advantageous for the voltage level of the voltage pulses to be lower than the voltage level of the constant heating voltage. The voltage level of the heating voltage is, for example, higher than 12 volts, and is, for example, approximately 18 volts.

Accordingly, there is specified in this case, in particular, a method for operating a device for the catalytic conversion of exhaust gases in an exhaust system, in particular for an exhaust system of an internal combustion engine, preferably for spark-ignition engines, which device includes at least one first and one second honeycomb body which are disposed adjacently in a common casing tube and which can be traversed in series by an exhaust gas. In this case, at least the first, electrically heatable honeycomb body, which has at least one current distributing structure, is disposed in the outer casing tube at a spacing from the latter. The adjacent honeycomb body is mechanically connected through the use of the support elements, which project into the honeycomb body and are disposed in an electrically insulated manner in the electrically heatable honeycomb body and are connected in electrically conductive fashion to the adjacent honeycomb body. The current distributing structure is then acted on initially with a plurality of short successive voltage pulses upon activation in order to burn off soot deposited on the support elements, before the current distributing structure is acted on with a (for example) constant continuous voltage to heat the honeycomb body.

The control unit is understood to be an electrical unit which controls the supply of current to the electrically heatable honeycomb body in such a way that, upon activation, initially a plurality of short successive voltage pulses are generated before the current distributing structure is acted on with a constant continuous voltage. The control unit may be connected to the engine controller in such a way that, upon a start of the engine, the control unit receives a signal to initially generate the voltage pulses before then switching to a constant continuous voltage.

With the objects of the invention in view, there is also provided a device for the catalytic conversion of exhaust gases in an exhaust system. The device comprises a casing tube, at least one first and one second honeycomb body disposed adjacent one another in the casing tube and configured to be traversed in series by an exhaust gas, at least the first honeycomb body being electrically heatable, having at least one current distributing structure and being spaced apart from the outer casing tube, sleeves disposed in the electrically heatable honeycomb body, support elements disposed in the sleeves, projecting into the honeycomb bodies for mechanically interconnecting the adjacent honeycomb bodies and electrically conductively connected to the second honeycomb body, electric insulation disposed between the support elements and the sleeves, and a control unit for the current distributing structures, the control unit configured to initially generate a plurality of short successive voltage pulses upon activation, before acting on the current distributing structure with a constant continuous voltage.

As a result of the voltage pulses, arcs are briefly formed between the electrically heatable honeycomb body and the support elements if soot depositions have formed between the electrically heatable honeycomb bodies and the support elements. These short arcs burn off the soot depositions, in such a way that the insulation takes effect again and it is no longer possible for a longer-burning arc, which would destroy the support elements, to be formed by the loading with the constant continuous voltage.

In accordance with another feature of the invention, the control unit is constructed to generate 3 to 10 voltage pulses which may have a duration of 10 to 100 ms, preferably of 50 ms.

In accordance with a concomitant feature of the invention, it is also advantageous for the device to interact with an 18 volt supply.

The method and the device are proposed, in particular, in combination with one another, and are, in particular, integrated into a motor vehicle.

Other features which are considered as characteristic for the invention are set forth in the appended claims. noting that the features specified in the claims may be combined with one another in any desired way.

Although the invention is illustrated and described herein as embodied in a method for operating a device having at least one electronically heatable honeycomb body and a device for the catalytic conversion of exhaust gases, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Figure 1:
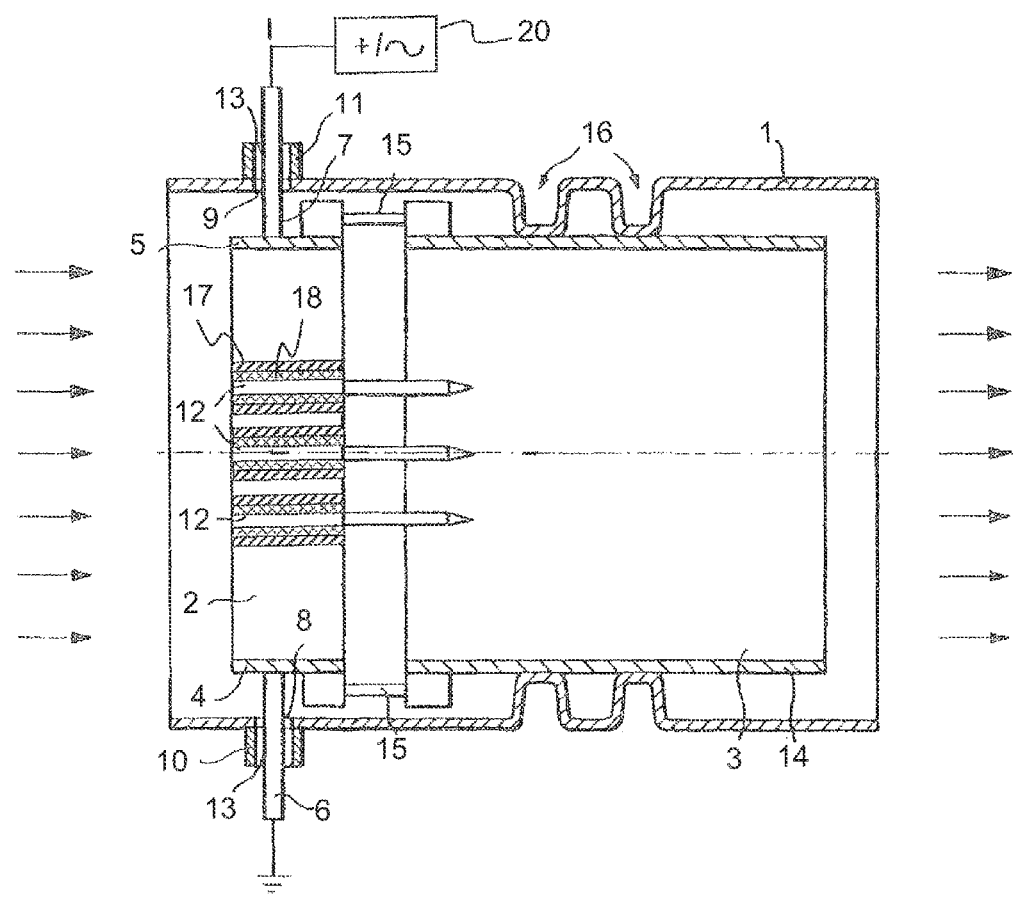
FIG. 1 is a diagrammatic, longitudinal-sectional view of a device for catalytic exhaust-gas conversion.

Referring now in detail to the figures of the drawings, with which the technical field as well as a particularly preferred structural variant which is not intended to restrict the invention will now be explained, and first, particularly, to FIG. 1 thereof, there is seen a preferred exemplary embodiment of a device for the catalytic conversion of exhaust gases in an exhaust system. The device includes first and second honeycomb bodies 2, 3 which are disposed in a common casing tube 1 and which can be traversed by an exhaust gas (see arrows) in series. The first honeycomb body 2 is disposed within and at a spacing from the common casing tube 1 and can be electrically heated. An outer lateral surface of the first honeycomb body 2 is formed by two shell-shaped current distributing structures 4, 5. The current distributing structure 4 is connected to an electrical power terminal 6 and the current distributing structure 5 is connected to a ground terminal 7. Electrodes for the electrical power terminal 6 and the ground terminal 7 project to the outside through respective openings 8, 9 formed in the common casing tube 1. The electrodes extend through connecting pieces 10, 11 which are welded to the common casing tube 1. The connecting pieces 10, 11 have an insulating layer 13, so that the electrodes are electrically insulated with respect to the common casing tube 1.

The two honeycomb bodies 2, 3 are connected to one another by support elements 12 which project into the honeycomb bodies, that is to say, in particular, that the first, electrically heatable honeycomb body 2 is disposed so as to be supported against an end surface the second honeycomb body 3. For better clarity, only three of a multiplicity of possible support elements 12 are illustrated by way of example.

The honeycomb body 3 has an inner casing tube 14. The current distributing structures 4, 5 are connected to the inner casing tube 14 of the honeycomb body 3 through the use of additional retaining elements 15.

Two encircling inner beads 16 are formed in the common casing tube 1. The two inner beads 16 are constructed so as to come into contact with the inner casing tube 14 of the honeycomb body 3. A cohesive connection may be provided on the contacting surfaces between the beads 16 and the inner casing tube 14.

The (metallic) support elements 12 are mounted in the electrically heatable honeycomb body 2 through the use of (for example metallic) sleeves 17, with an electric insulation 18 (for example in the form of a ceramic coating) being disposed in an intermediate space between the support elements 12 and the sleeves 17.

Figure 2:
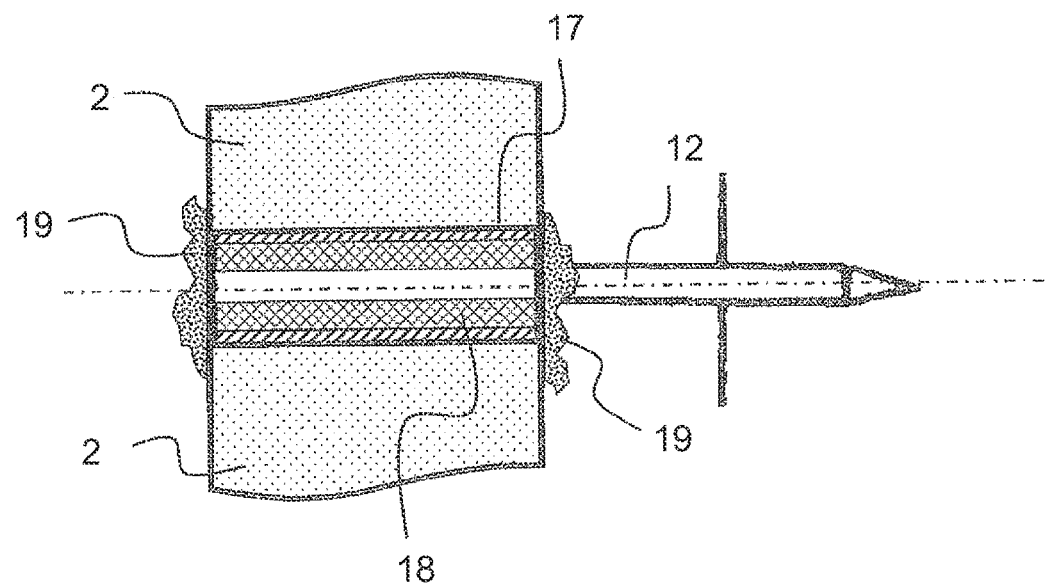
FIG. 2 is an enlarged, fragmentary, sectional view of a support element disposed in an electrically heatable honeycomb body.

FIG. 2 shows the configuration of a support element 12 in the electrically heatable honeycomb body 2 on an enlarged scale, and the sleeves 17 and the insulation 18 can be seen as well.

If the exhaust gas contains soot particles, soot depositions 19 can form at both sides of the electrically heatable honeycomb body 2. Since soot is electrically conductive, as is known, the soot depositions 19 form an electrically conductive bridge between the electrically heatable honeycomb body 2, the (metallic) sleeves 17 disposed therein and/or the (metallic) support elements 12. If a constant continuous voltage is now applied, according to the prior art, to the electrically conductive honeycomb body 2 through the current distributing structures 4, 5, a short circuit is initially formed through the soot deposition 19, and a permanent arc is subsequently formed when the soot deposition 19 has burned off. That arc results in damage to or even the destruction of the support elements 12.

In order to prevent that occurrence, a control unit 20 is provided which is configured to initially generate a plurality of short successive voltage pulses upon activation, before the current distributing structures 4, 5 are acted upon with a constant heating voltage.

Figure 3:
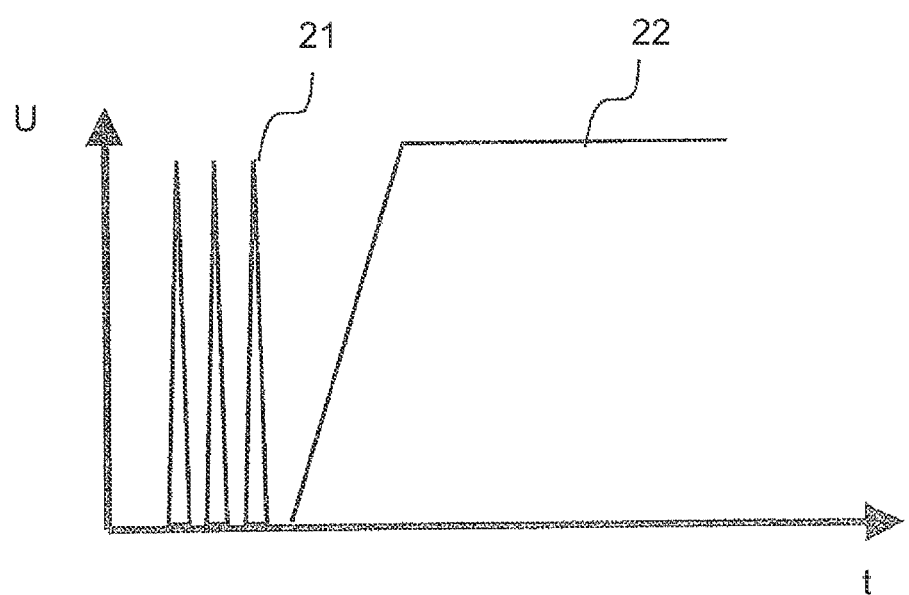
FIG. 3 is a graphic illustration of voltage pulses and a constant heating voltage generated by a control unit.

It can be seen in FIG. 3 that firstly three short voltage pulses 21 are generated by the control unit 20. Those voltage pulses 21 cause the soot deposition 19 to be burned off without damage to the support elements 12, after which a constant heating voltage 22 can be applied by the control unit without the possibility of an arc being formed and damaging the support elements 12. As seen in FIG. 3, the control unit 20 initially generates three voltage pulses 21 and subsequently generates the constant continuous voltage 22, but it is also possible, if necessary, for more voltage pulses to be generated. It has been found that a maximum of 10 voltage pulses is generally adequate to burn off any soot depositions 19.

The duration of the voltage pulses may be between 10 and 100 milliseconds, and is preferably 50 milliseconds.

In FIG. 3, the voltage level of the voltage pulses 21 is the same as that of the constant heating voltage 22, but those voltage levels may also differ. For example, the voltage level of the voltage pulses may be lower than the voltage level of the constant heating voltage in order to safely burn off the soot deposition 19 without dangerous arcs being formed.

The present invention is not restricted to the illustrated exemplary embodiment. Numerous modifications of the invention are in fact possible within the scope of the claims.

The invention claimed is:

1. A method for operating a device having at least one electrically heatable honeycomb body to be traversed by exhaust gas, the at least one honeycomb body having at least one current distributing structure, the method comprising the following steps:
    activating the at least one current distributing structure by initially acting on the at least one current distributing structure with a plurality of short successive voltage pulses; and
    then acting on the at least one current distributing structure with a constant heating voltage to heat the at least one honeycomb body.

2. The method according to claim 1, which further comprises generating three to ten of the voltage pulses before applying the heating voltage.

3. The method according to claim 1, which further comprises providing the voltage pulses with a duration of 10 to 100 milliseconds.

4. The method according to claim 1, which further comprises providing the voltage pulses with a voltage level being lower than a voltage level of the constant heating voltage.

5. A method for catalytically converting exhaust gases in an exhaust system, the method comprising the following steps:
    providing a device having at least one electrically heatable honeycomb body to be traversed by exhaust gas, the at least one honeycomb body having at least one current distributing structure;
    activating the at least one current distributing structure by initially acting on the at least one current distributing structure with a plurality of short successive voltage pulses; and
    then acting on the at least one current distributing structure with a constant heating voltage to heat the at least one honeycomb body.

6. A device for the catalytic conversion of exhaust gases in an exhaust system, the device comprising:
    a casing tube;
    at least one first and one second honeycomb body disposed adjacent one another in said casing tube and configured to be traversed in series by an exhaust gas;
    at least said first honeycomb body being electrically heatable, having at least one current distributing structure and being spaced apart from said outer casing tube;
    sleeves disposed in said electrically heatable honeycomb body;
    support elements disposed in said sleeves, projecting into said honeycomb bodies for mechanically interconnecting said adjacent honeycomb bodies and electrically conductively connected to said second honeycomb body;
    electric insulation disposed between said support elements and said sleeves; and
    a control unit for said current distributing structures, said control unit configured to initially generate a plurality of short successive voltage pulses upon activation, before acting on said current distributing structure with a constant continuous voltage.

7. The device according to claim 6, wherein said control unit is configured to generate three to ten voltage pulses.

8. The device according to claim 6, which further comprises an 18 volt supply for the device.

9. The device according to claim 7, which further comprises an 18 volt supply for the device.

* * * * *